(12) United States Patent
Suzuki (10) Patent No.: US 11,617,481 B2
(45) Date of Patent: Apr. 4, 2023

(54) HANDHELD ELECTRIC VACUUM

(71) Applicant: YAMABIKO CORPORATION, Tokyo (JP)

(72) Inventor: Kenji Suzuki, Tokyo (JP)

(73) Assignee: YAMABIKO CORPORATION, Tokyo (JP)

( * ) Notice: Subject to any disclaimer, the term of this patent is extended or adjusted under 35 U.S.C. 154(b) by 0 days.

(21) Appl. No.: 17/540,484

(22) Filed: Dec. 2, 2021

(65) Prior Publication Data

US 2022/0233036 A1    Jul. 28, 2022

(30) Foreign Application Priority Data

Jan. 27, 2021  (JP) .............................. JP2021-011209

(51) Int. Cl.
  *A47L 5/24*    (2006.01)
  *A47L 9/24*    (2006.01)
  *A47L 9/32*    (2006.01)

(52) U.S. Cl.
  CPC .................. *A47L 5/24* (2013.01); *A47L 9/248* (2013.01); *A47L 9/322* (2013.01)

(58) Field of Classification Search
  CPC .............. A47L 5/225; A47L 5/24; A47L 5/14; A47L 9/2884; A47L 9/248; A47L 9/322; A47L 9/08; A47L 9/2842; A01G 20/47
  USPC .................................. 15/330, 344, 328, 405
  See application file for complete search history.

(56) References Cited

U.S. PATENT DOCUMENTS

| 1,078,512 | A | * | 11/1913 | Mills | A47L 5/14 |
| | | | | | 15/409 |
| 5,280,667 | A | * | 1/1994 | Coathupe | A47L 9/08 |
| | | | | | 15/345 |
| 5,621,945 | A | * | 4/1997 | Howells | A01G 20/47 |
| | | | | | 15/409 |
| 6,108,863 | A | * | 8/2000 | Lin | A47L 5/14 |
| | | | | | 15/346 |
| 6,141,824 | A | * | 11/2000 | Fujiwara | A47L 5/14 |
| | | | | | 15/330 |
| 9,874,225 | B2 | | 1/2018 | Langhans et al. | |

(Continued)

FOREIGN PATENT DOCUMENTS

| CN | 112482284 A * | 3/2021 | ........... E01H 1/0809 |
| CN | 214499471 U * | 10/2021 | ............. A47L 11/38 |

(Continued)

OTHER PUBLICATIONS

CN-214499471-U translation Espacenet (Year: 2022).*

(Continued)

*Primary Examiner* — Monica S Carter
*Assistant Examiner* — Timothy Brady
(74) *Attorney, Agent, or Firm* — Bacon & Thomas, PLLC (57) ABSTRACT

A handheld electric vacuum configured to perform sucking work includes: a pipe including a suction port at one end and a discharge port at the other end; a blower provided outside the pipe and driven by an electric motor; a handle provided outside the pipe and near the discharge port in a longitudinal direction of the pipe, and configured to be held by a hand; and an ejector provided near the suction port in the longitudinal direction of the pipe, and configured to feed pressurized wind generated by the blower into the pipe from around the pipe, and to eject the pressurized wind to the discharge port.

9 Claims, 7 Drawing Sheets

(56) References Cited

U.S. PATENT DOCUMENTS

2021/0007294 A1\* 1/2021 Righi .................... A01G 20/47
2021/0282339 A1\* 9/2021 Chen .................... A01G 20/47

FOREIGN PATENT DOCUMENTS

DE 29519900 U1 2/1996
EP 0684341 A1 11/1995

OTHER PUBLICATIONS

CN-112482284-A translation Espacenet (Year: 2022).\*
Extended European Search Report dated May 11, 2022 cited in Appln. No. 21215126.0.

\* cited by examiner

HANDHELD ELECTRIC VACUUM

CROSS-REFERENCE TO RELATED APPLICATIONS

The present application claims priority from Japanese Patent Application No. 2021-011209 filed on Jan. 27, 2021, and the entire contents of which are hereby incorporated by reference.

BACKGROUND

1. Technical Field

The present invention relates to a handheld electric vacuum configured to perform sucking work to suck in dust and debris.

2. Related Art

There is known a vacuum used in work to suck in and collect dust such as fallen leaves and debris (hereinafter referred to as "sucking work") disclosed, for example, in U.S. Pat. No. 9,874,225. This vacuum is configured to generate a suction pressure (negative pressure) in a pipe by the suction of a blower to suck in dust and so forth into the pipe from a suction port provided at one end of the pipe, and discharge the sucked materials such as the dust from a discharge port provided at the other end of the pipe to collect the sucked materials in a collector, such as a bag. The entire contents of the disclosure are hereby incorporated by reference.

SUMMARY

The invention provides a handheld electric vacuum for the sucking work including: a pipe including a suction port at one end and a discharge port at the other end; a blower provided outside the pipe and driven by an electric motor; a handle provided outside the pipe and near the discharge port in a longitudinal direction of the pipe, and configured to be held by a hand; and an ejector provided near the suction port in the longitudinal direction of the pipe, and configured to feed pressurized wind generated by the blower into the pipe from around the pipe, and to eject the pressurized wind to the discharge port.

DETAILED DESCRIPTION

The above-described conventional vacuum sucks in the air from the pipe by the blower in order to generate a negative pressure in the pipe, and discharge the air from a pressure flow path divided from the pipe to the outside, and part of the materials sucked from the suction port into the pipe is fed to the pressure flow path via a casing of the blower with a fan being rotated. Therefore, this conventional vacuum has a problem that the fan of the blower contacts the sucked materials, and consequently to generate noise or damage the fan.

In addition, part of the above-described pressure flow path is narrowed because the blower is located, and therefore the conventional vacuum cannot collect large materials sucked from the suction port into the pipe via the pressure flow path. Moreover, it is not possible to obtain a large blowing pressure toward the discharge port in the downstream side from the pressure flow path of the pipe body, and therefore not possible to smoothly feed the large sucked materials to the discharge port. As a result, the conventional vacuum cannot efficiently collect large sucked materials.

Furthermore, the conventional vacuum is dedicated to the sucking work, and when it is used to clean up fallen leaves spread in a wide area, a blower for blowing is used together to gather the fallen leaves on the ground to some extent before the sucking work in order to improve the efficiency of the sucking work. Therefore, there is a demand of a working machine capable of switching between the suction and the blowing. However, the conventional vacuum has a problem that it is not possible to easily achieve the switching due to its structure.

The present invention is proposed to address the above-described problems. It is therefore an object of the invention to provide a handheld electric vacuum for the sucking work capable of suppressing the noise during the work, preventing the damage of the blower, efficiently collecting large sucked materials, and easily switching between the suction of the vacuum and the blowing of the blower.

Hereinafter, an embodiment of the present invention will be described with reference to the drawings. The same reference numbers in the different drawings indicate the same functional sections, and therefore repeated description for each of the drawings is omitted.

Figure 1A:
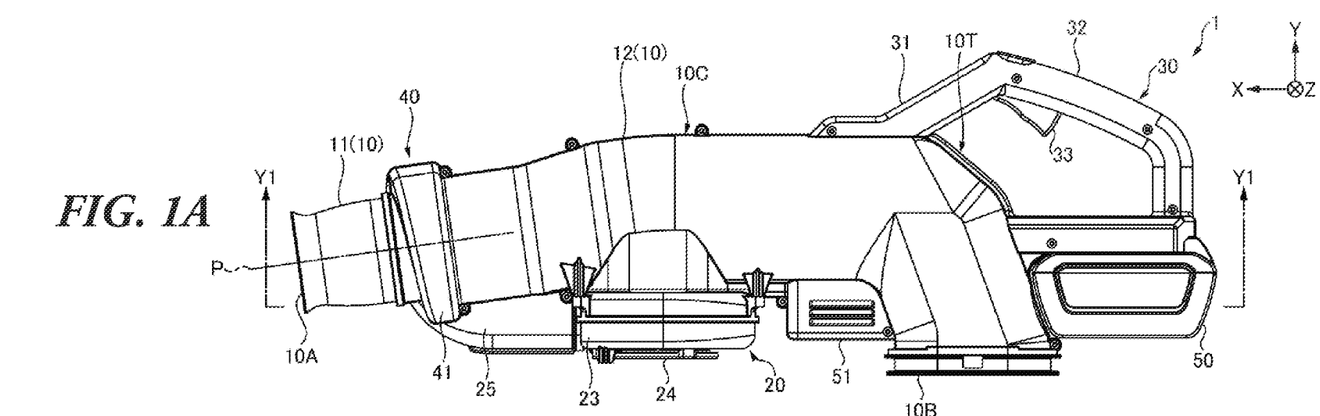
FIG. 1A is an external view illustrating a handheld electric vacuum according to an embodiment of the invention.
Figure 1B:
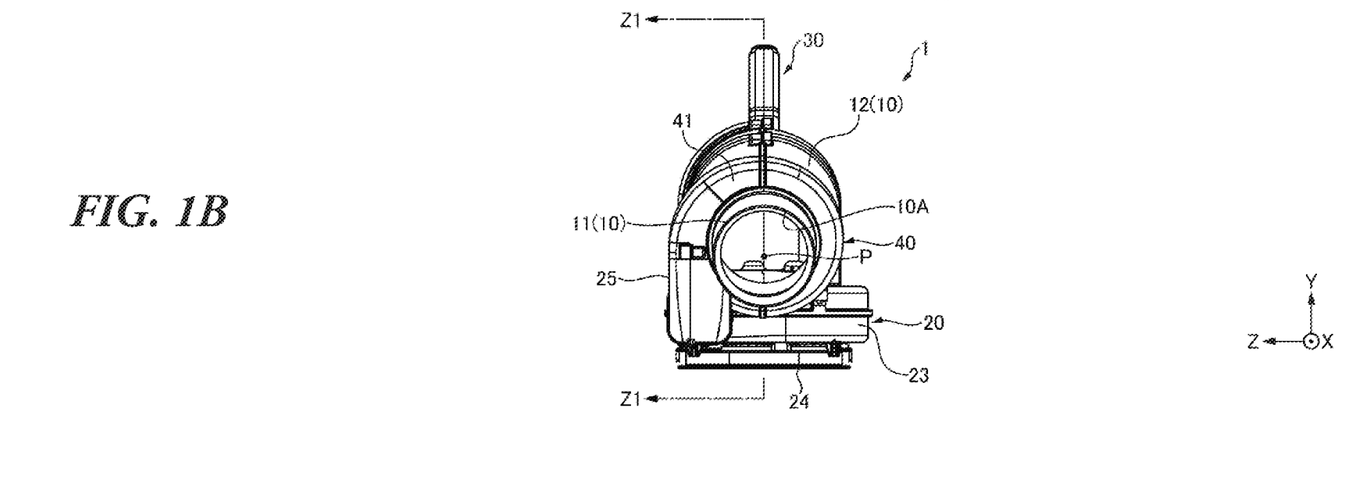
FIG. 1B is a front view illustrating the handheld electric vacuum according to an embodiment of the invention.
Figure 2:
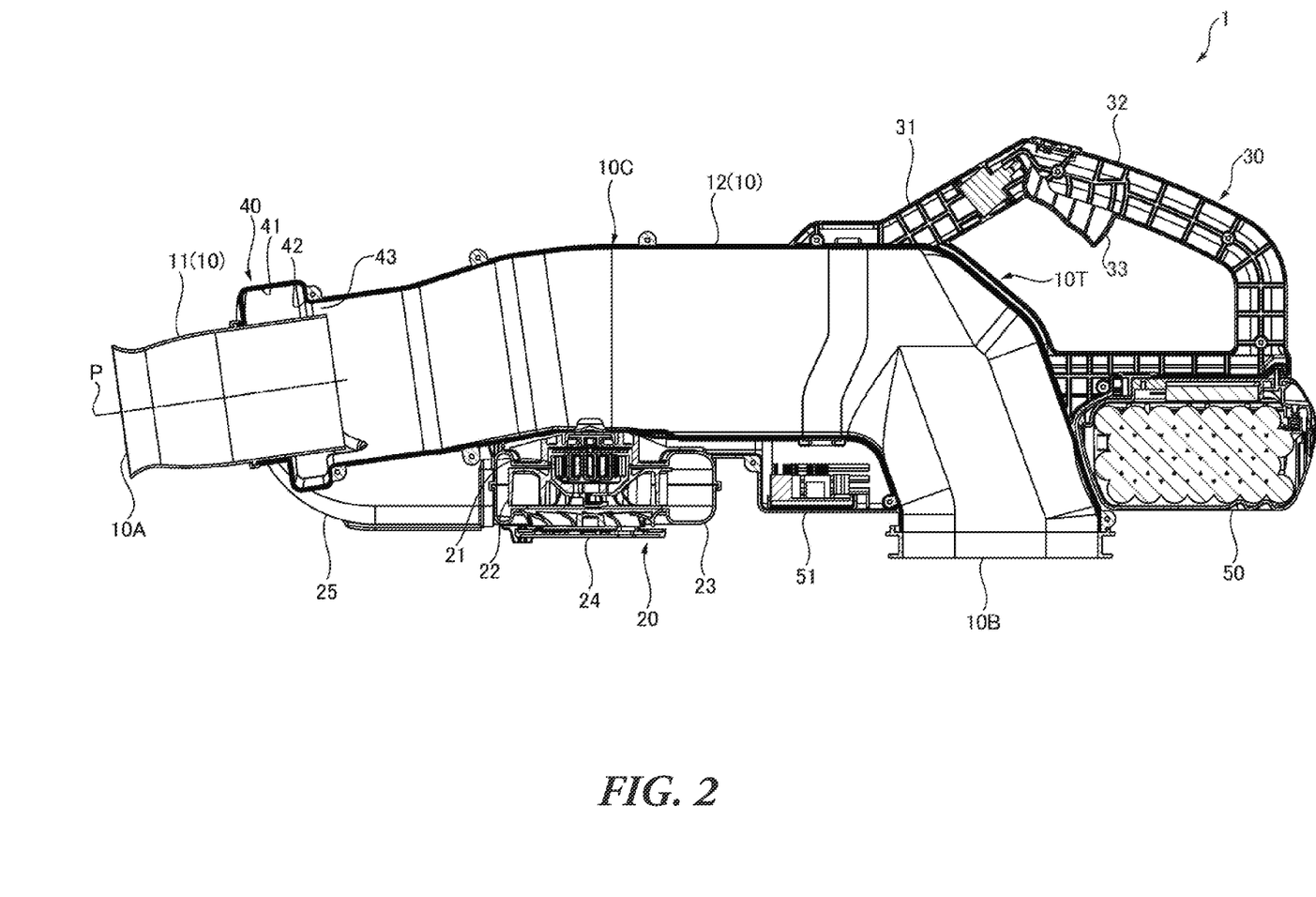
FIG. 2 is a cross-sectional view taken along line Z1-Z1 of FIG. 1B.
Figure 3:
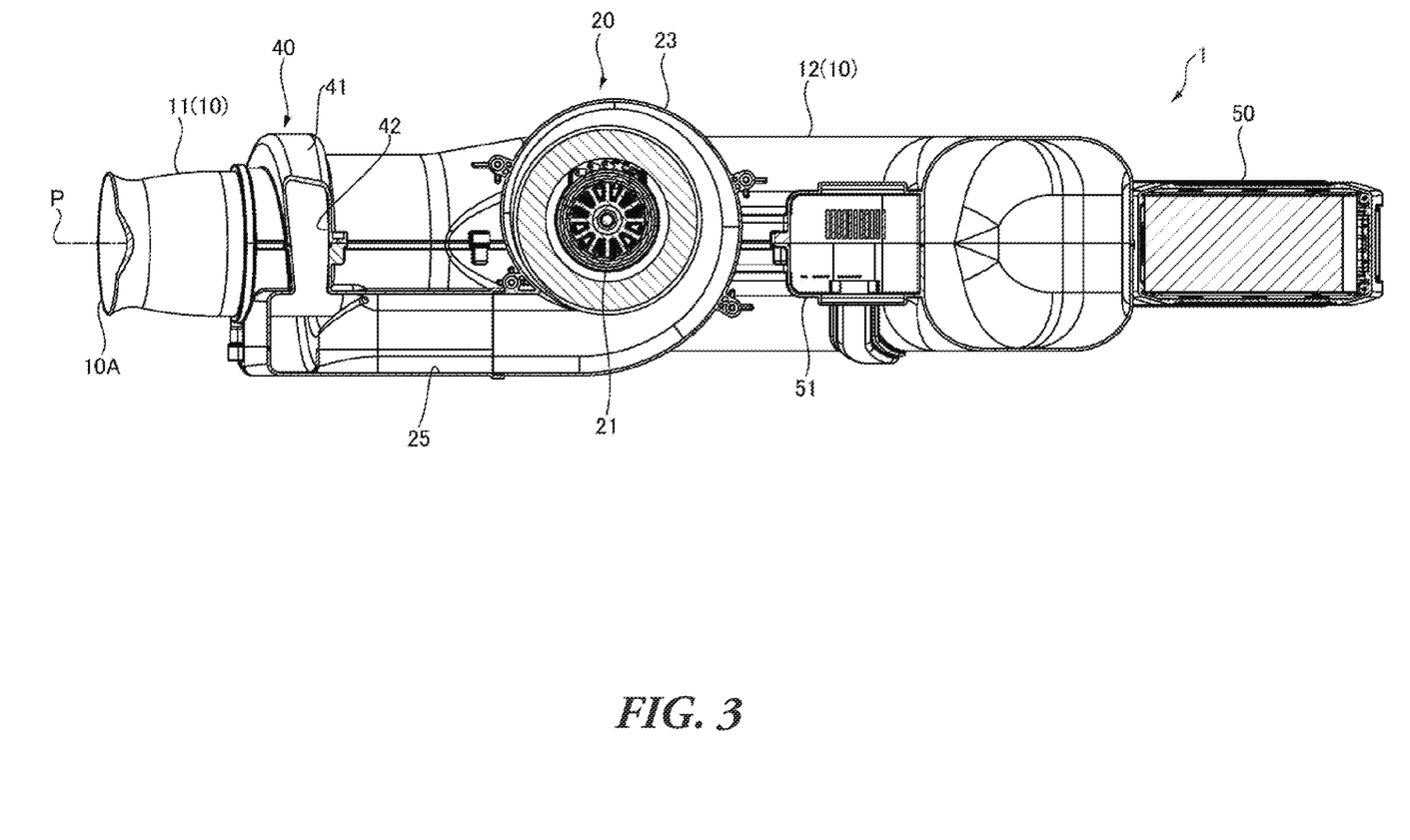
FIG. 3 is a cross-sectional view taken along line Y1-Y1 of FIG. 1A.

As illustrated in FIGS. 1 to 3, a handheld electric vacuum (hereinafter simply referred to as "vacuum") 1 is a handheld working machine for the sucking work, and includes a pipe 10 configured to suck in dust and debris, a blower 20, a handle 30, and an ejector 40.

The pipe 10 includes a suction port 10A at one end and a discharge port 10B at the other end, and is configured to suck in materials from the suction port 10A and discharge the sucked materials from the discharge port 10B. During the sucking work, a collecting bag and so forth (not shown) is attached to the discharge port 10B.

In the example illustrated, the pipe 10 includes a front pipe 11 having the suction port 10A, and a pipe body 12 having the discharge port 10B at the base end. The front pipe 11 is connected to the front end of the pipe body 12.

In addition, the inside diameter of the pipe 10 including the front pipe 11 and the pipe body 12 over the entire length of the pipe 10 is equal to or greater than the bore of the suction port 10A. By this means, all the materials sucked from the suction port 10A into the pipe 10 are smoothly fed to the discharge port 10B with a little resistance.

In the example illustrated, the pipe 10 includes a bending portion 10T between a center 10C of the pipe 10 in the longitudinal direction and the discharge port 10B, but may be linear without the bending portion 10T.

The blower 20 is provided outside the pipe 10. To be more specific, the blower 20 is located adjacent to the periphery of the pipe 10. With reference to FIG. 2, the blower 20 is a centrifugal blower driven by a built-in electric motor 21, and is disposed such that the driving shaft of the electric motor 21 is coaxially with the rotating shaft of a fan 22 in a direction intersecting the longitudinal direction of the pipe 10. A casing 23 of the blower 20 formed as a volute is disposed along the periphery of the pipe 10. Wind sucked from a sucking portion 24 by the rotation of the fan 22 passes through the casing 23 and is fed, as compressed air, into a pressure flow path 25 disposed along the periphery of the pipe 10. Here, a compressor may be adopted instead of the illustrated centrifugal blower, as long as it can feed the compressed air.

The handle 30 to be held by a hand is provided outside the pipe 10 and near the discharge port 10B in the longitudinal direction of the pipe 10. In the example illustrated, the handle 30 is disposed between the center 10C of the pipe 10 in the longitudinal direction and the discharge port 10B.

Also in the example illustrated, the handle 30 is provided above the bending portion 10T of the pipe 10, and includes a handle frame 31. One end of the handle frame 31 is connected to the front end side of the pipe 10 and the other end is connected to the base end side of the pipe 10 with respect to the bending portion 10T. A grip 32 is provided in the center of the handle frame 31, and an operating member 33 is provided on the inside of the grip 32 and configured to adjust the rotating speed of the electric motor 21 of the blower 20.

A battery 50 configured to supply the electric motor 21 with power is attached to the outside of the pipe 10 near the discharge port 10B. In the example illustrated, a housing of the battery 50 is located under the handle 30, and the base end of the pipe 10 is closer to the housing than the handle 30.

The ejector 40 is provided near the suction port 10A in the longitudinal direction of the pipe 10, and configured to feed pressurized wind generated by the blower 20 from around the pipe 10 into the pipe 10 and eject the pressurized wind to the discharge port 10B. The pressurized wind is ejected from the ejector 40 to the discharge port 10B along the inner surface of the pipe 10. This pressurized wind causes the pressure inside the pipe 10 to be lowered, thereby to generate suction flow in the pipe 10 from the suction port 10A toward the discharge port 10B.

The ejector 40 includes a circular flow path 41 protruding outward from the pipe 10. The circular flow path 41 is provided circumferentially around a central axis P of the pipe 10. The pressurized wind generated by the blower 20 is introduced into the circular flow path 41 via the pressure flow path 25. As illustrated in FIG. 1B and FIG. 3, the pressure flow path 25 is connected to the circular flow path 41 at a position such that the center of the pressure flow path 25 is located outside the circular flow path 41. By this means, the pressurized wind becomes swirling flow around the central axis P of the pipe 10 in the circular flow path 41.

The circular flow path 41 includes an opening 42 configured to communicate with the inside of the pipe 10 over the entire circumference around the central axis P of the pipe 10. Then, a nozzle 43 is formed in an inner part of the pipe 10 which corresponds to the opening 42, and the pressurized wind is whirling and ejected from the nozzle 43 along the inner surface of the pipe 10.

In the example illustrated, the nozzle 43 is formed by the front pipe 11 inserted in the pipe body 12. By this means, the pressurized wind is fed from the circular flow path 41 of the ejector 40 toward the outside of the front pipe 11 inserted into the pipe body 12, and ejected to the discharge port 10B along the outside (outer circumferential surface) of the front pipe 11.

The vacuum 1 configured as described above forms one-way suction flow without being divided in the pipe 10 from the suction port 10A at one end to the discharge port 10B at the other end. In addition, there is no portion having a reduced diameter in the pipe 10, and therefore the pipe 10 maintains its inside diameter which is sufficient to allow large sucked materials to pass therethrough along the longitudinal direction.

By this means, the materials sucked by the vacuum 1 from the suction port 10A into the pipe 10 can be efficiently guided to the discharge port 10B, and even when large materials are sucked from the suction port 10A, the sucked materials can be smoothly guided to the discharge port 10B without clogging, and then can be collected.

In particular, the swirling flow is fed from the ejector 40 into the pipe 10, and therefore the vacuum 1 can convey the sucked materials being caught by the swirling flow to the discharge port 10B. By this means, it is possible to reliably convey the sucked materials by the centrifugal force without an excessively high suction pressure.

In addition, the vacuum 1 has no blowing from the pipe 10 toward the blower 20, and therefore the materials sucked in the pipe 10 cannot enter into the blower 20. By this means, there is no risk of having a problem that the sucked materials collide with the fan 22 of the blower 20 to generate noise or damage the fan 22. Therefore, it is possible to suppress the noise during the work, and also prevent the damage of the blower 20 to maintain high durability.

Next, the layout of the components of the vacuum 1 will be described. In the example illustrated in FIGS. 1 to 3, the vacuum 1 includes the ejector 40, the blower 20, the handle 30, and the battery 50 arranged in the order from the front end side (the suction port 10A side) of the pipe 10. In addition, the pipe 10 includes the bending portion 10T, the handle 30 is provided above the bending portion 10T, and a drive circuit 51 of the blower 20 is provided in a space below the bending portion 10T.

With this layout of the components, the blower 20 is disposed near the ejector 40, and therefore it is possible to reduce the length of the pressure flow path 25, and consequently to reduce the loss in the blowing performance. In addition, by providing the bending portion 10T, an empty space around the pipe 10 is efficiently used to dispose the blower 20 and the drive circuit 51. This allows compact storage of the components around the pipe 10 as a whole. Moreover, the battery 50 having a heavy weight is disposed near the handle 30, and therefore it is possible to reduce the weight load when the grip 32 of the handle 30 is held by one hand.

Figure 4:
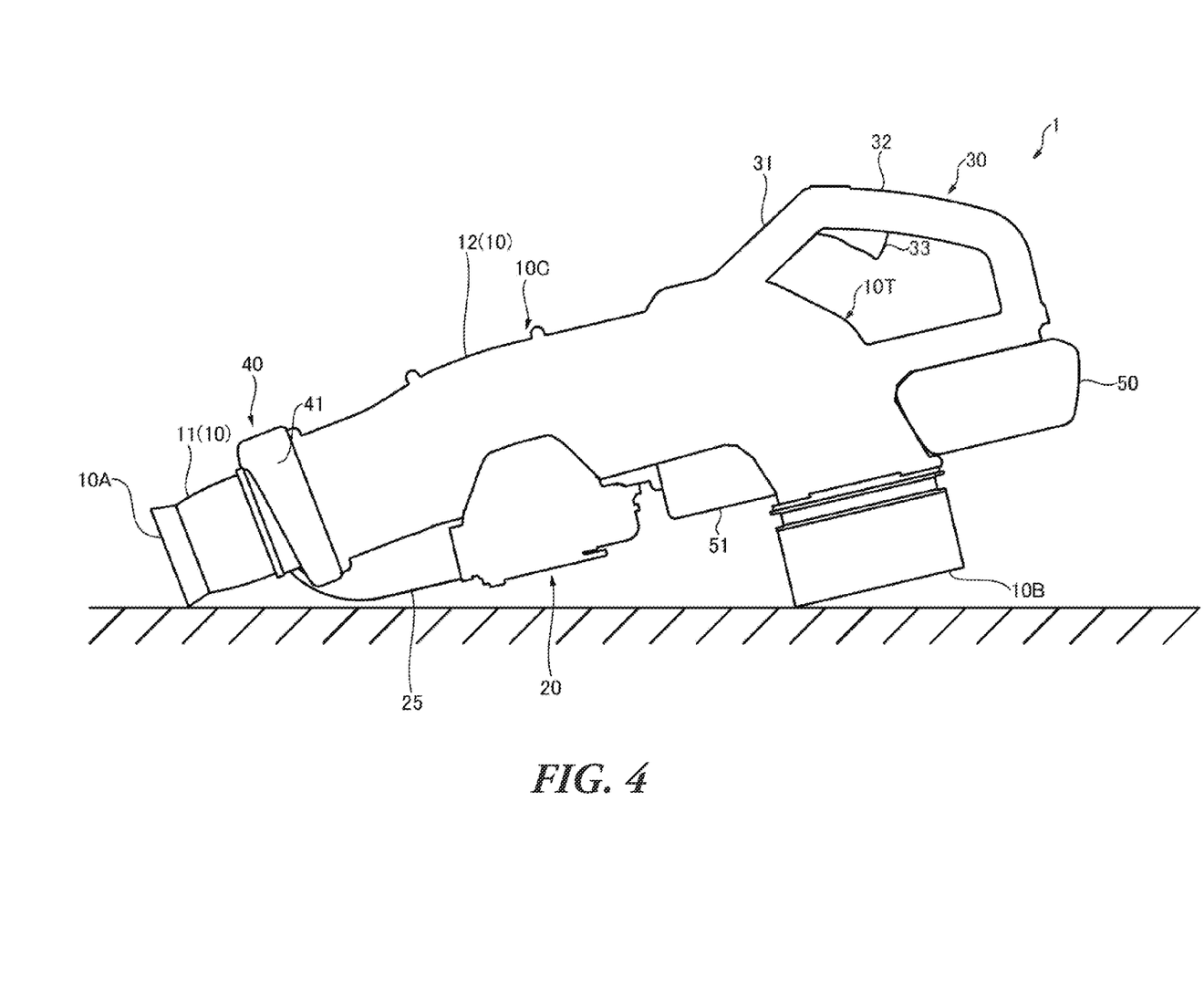
FIG. 4 illustrates a state where a pipe of the handheld electric vacuum is put on the ground.

Furthermore, in a case where the blower 20 and the drive circuit 51 are disposed under the pipe 10 including the bending portion 10T, the blower 20 is stored in the empty space under the pipe 10 formed by the bending portion 10T when the vacuum body is placed on the ground as illustrated in FIG. 4. Therefore, it is possible to prevent a problem that the blower 20 touches the ground.

Figure 5A:
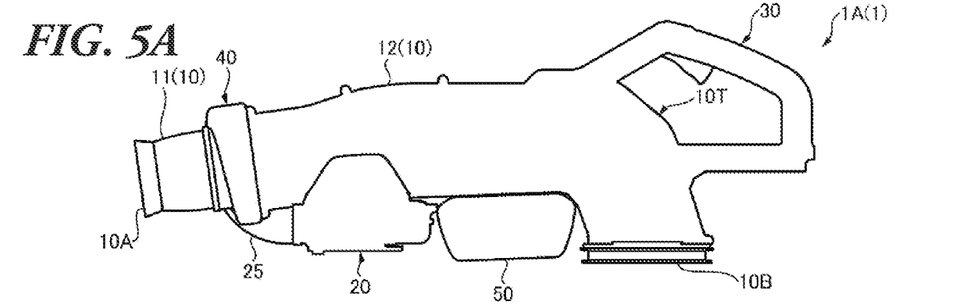
FIG. 5A illustrates layout example 1 of a blower and a battery in the handheld electric vacuum.
Figure 5B:
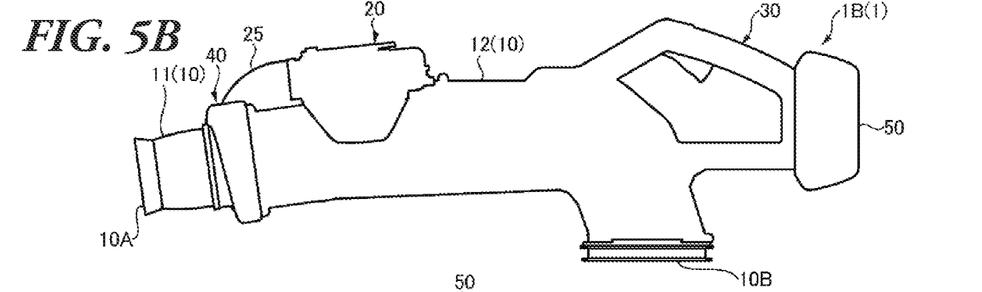
FIG. 5B illustrates layout example 2 of the blower and the battery in the handheld electric vacuum.
Figure 5C:
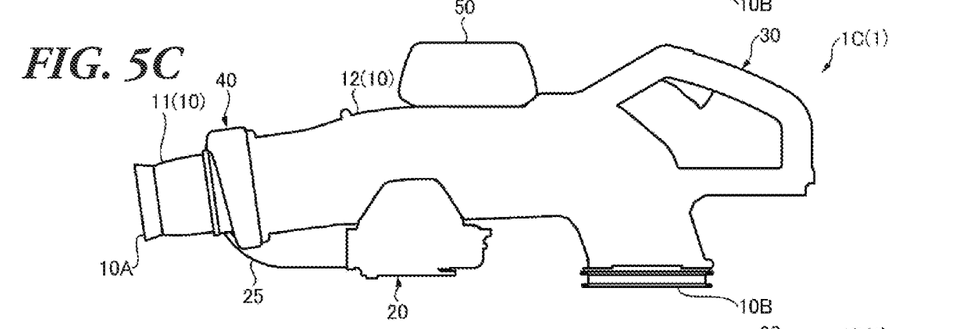
FIG. 5C illustrates layout example 3 of the blower and the battery in the handheld electric vacuum.
Figure 5D:
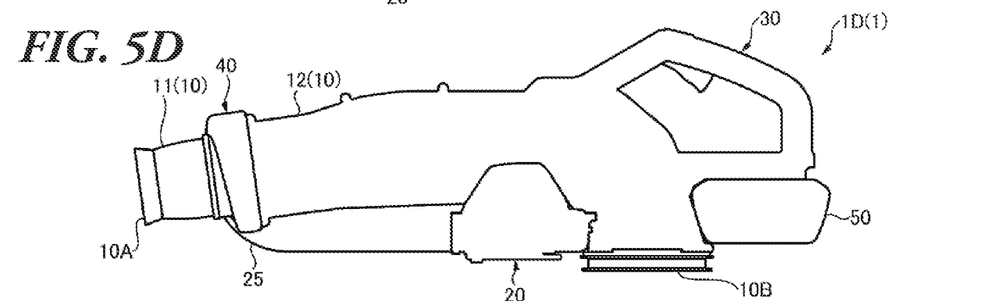
FIG. 5D illustrates layout example 4 of the blower and the battery in the handheld electric vacuum.

However, the above-described layout of the components of the vacuum 1 is merely an example, and various layouts may be adopted in an appropriate manner. FIGS. 5A to 5D illustrate examples of the various layouts. FIG. 5A illustrates layout example 1 where the blower 20 and the battery 50 are disposed under the pipe 10. FIG. 5B illustrates layout example 2 where the blower 20 is disposed on the pipe 10 and the battery 50 is disposed on the base end side of the handle 30. FIG. 5C illustrates layout example 3 where the blower 20 is disposed under the pipe 10, and the battery 50 is disposed on the pipe 10. FIG. 5D illustrates layout example 4 where the blower 20 is disposed under the pipe 10, and the battery 50 is disposed under the handle 30. Here, these examples are by no means limiting, but various layouts are possible taking into account the weight balance and so forth.

Figure 6:
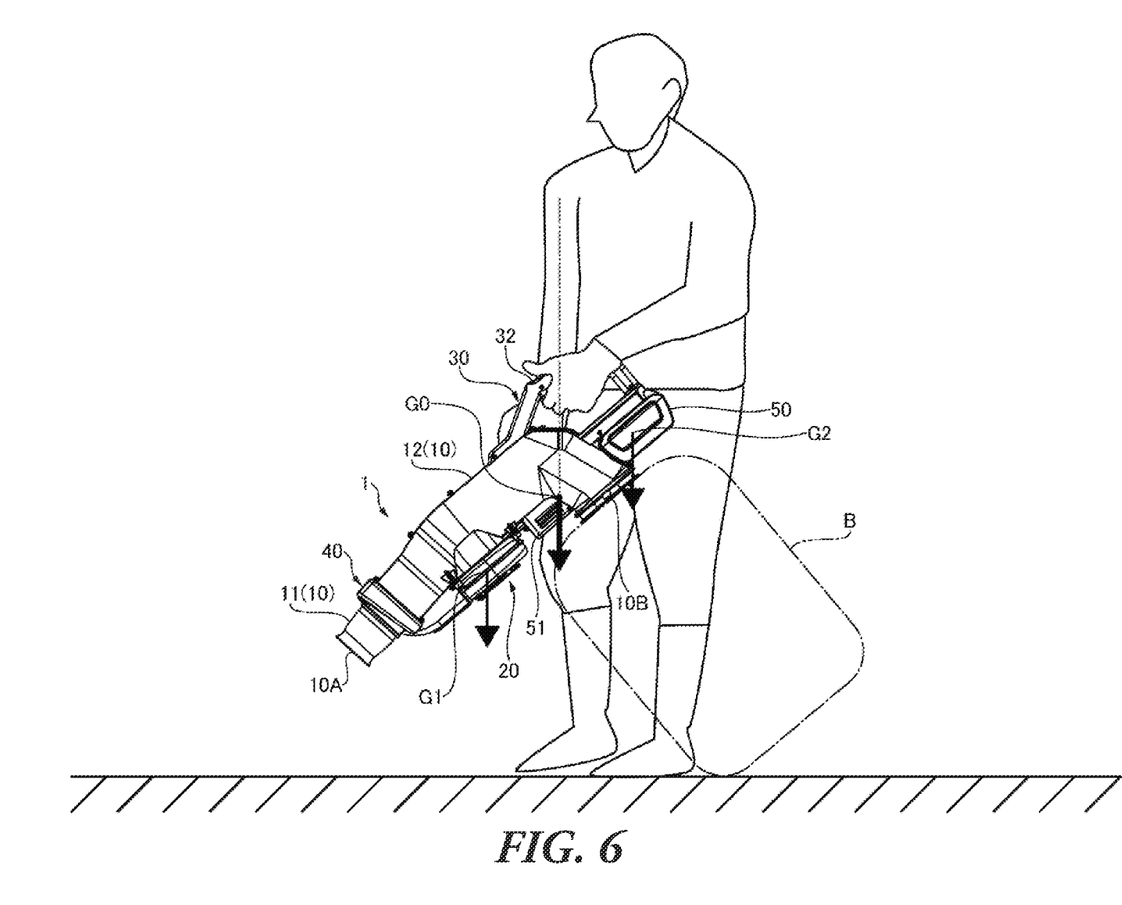
FIG. 6 illustrates a state where the handheld electric vacuum is used.

As illustrated in FIG. 6, the grip 32 of the handle 30 is held by one hand, and the suction port 10A of the pipe 10 faces downward, in order to perform the sucking work of the vacuum 1. A bag B to collect the sucked materials in the pipe 10 is attached to the discharge port 10B of the pipe 10 appropriately.

In this case, as the example illustrated in FIGS. 1 and so forth, the blower 20 and the battery 50 of the vacuum 1 each having a heavy weight are disposed in front of the grip 32 and behind the grip 32, respectively. By this means, the handle 30 is located between a center of gravity G1 of the blower 20 and a center of gravity G2 of the battery 50, and a center of gravity G0 (appropriately the center of gravity of the vacuum body) obtained by composition of the weight of the blower 20 (center of gravity G1) and the weight of the battery 50 (center of gravity G2) is located below the grip 32 in the vertical direction.

In this way, the weigh balance is achieved such that the center of gravity of the vacuum body 1 is located below the grip 32 of the handle 30. By this means, the worker can perform the work by holding the grip 32 in a good balance without suffering from a heavy weight load. In addition, in each of the examples illustrated in FIG. 5A to 5D, it is possible to provide comfortable work as a handheld working machine by appropriately considering the weight balance, in the same way as FIG. 6.

Figure 7A:
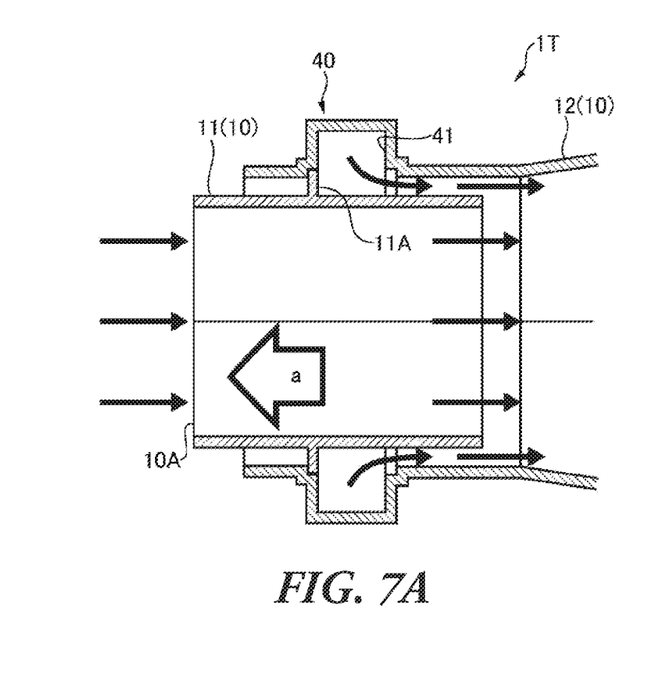
FIG. 7A illustrates a switching mechanism to switch between the suction of the vacuum and the blowing of the blower, where the handheld electric vacuum is switched to the sucking state.
Figure 7B:
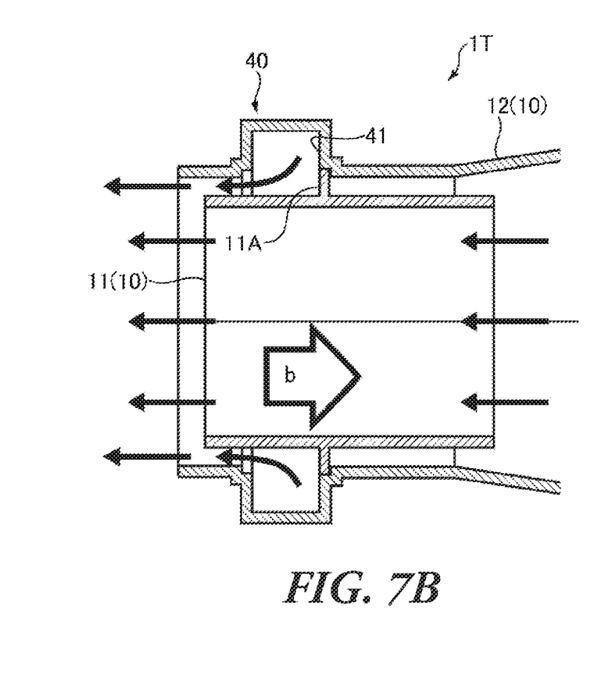
FIG. 7B illustrates the switching mechanism to switch between the suction of the vacuum and the blowing of the blower, where the handheld electric vacuum is switched to the blowing state.

With an embodiment illustrated in FIGS. 7A and 7B, a vacuum 1T can switch between the sucking work and the blowing work by incorporating a simple switching mechanism into the above-described vacuum 1 (the components except for the switching mechanism are the same as those of the vacuum 1).

As the switching mechanism, the front pipe 11 is slidably connected to the pipe body 12, and a division plate 11A is provided on the periphery of the front pipe 11 and configured to switch between the discharge port 10B and the suction port 10A to which the pressurized wind fed by the ejector 40 is ejected.

FIG. 7A illustrates the switched state for the sucking work. In this state, the front pipe 11 is slid in the direction indicated by an arrow a (toward the front end), and the division plate 11A contacts a stopper provided at the edge of the circular flow path 41 on the front end side. By this means, the division plate 11A blocks the pressurized wind flowing from the circular flow path 41 toward the front end of the pipe 10, and therefore the pressurized wind entering from the circular flow path 41 into the pipe 10 is ejected to the discharge port 10B along the periphery of the front pipe 11. In this state, the front end of the front pipe 11 is the suction port 10A, and suction flow is formed in the pipe 10.

On the other hand, FIG. 7B illustrates the switched state for the blowing work. In this state, the front pipe 11 is slid in the direction indicated by an arrow b (toward the base end), and the division plate 11A contacts a stopper provided at the edge of the circular flow path 41 on the base end side. By this means, the division plate 11A blocks the pressurized wind flowing from the circular flow path 41 toward the base end of the pipe 10, and therefore the pressurized wind entering from the circular flow path 41 into the pipe 10 is ejected to the front end (suction port 10A) along the periphery of the front pipe 11. In this state, the front end of the front pipe 11 serves as a blowing port, and discharge flow is formed in the pipe 10 from the base end to the front end of the pipe 10.

In the example illustrated in FIG. 7B, the front end (suction port 10A) of the front pipe 11 is stored in the pipe body 12. By this means, the direction of the pressurized wind ejected to the front end along the periphery of the front pipe 11 is regulated in the front end of the pipe body 12 to prevent the pressurized wind from broadening, and the wind blows off from the front end of the pipe body 12. By this means, it is possible to blow a target, and therefore to effectively perform gathering work.

As described above, the vacuum 1T according to the embodiment of the invention as illustrated in FIGS. 7A and 7B becomes a working machine serving as a vacuum and a blower by incorporating a simple switching mechanism. Conventionally, there is known the switching between a vacuum and a blower by such as an external attachment. In this case, the detaching and attaching of the attachment is complicated, and therefore it takes a lot of trouble with the switching. The vacuum 1T according to the embodiment of the invention does not need to attach and detach the attachment, and can switch between the vacuum and the blower by simple switching operation. Therefore, it is possible to allow not only simple operation, but also easy maintenance and management because there is no need to separately store the attachment.

As described above, the handheld electric vacuum for the sucking work can suppress the noise during the work, prevent the damage of the blower, efficiently collect large sucked materials, and easily incorporate a switching mechanism to switch between the suction of the vacuum and the blowing of the blower.

When used to clean up fallen leaves spread in a wide area, the vacuum 1T according to the embodiment of the invention is switched to the blower to gather the fallen leaves on the ground to some extent, and then switched to the vacuum to suck in the gathered fallen leaves. By this means, it is possible to allow efficient collecting work.

As described above, the embodiments of the present invention have been described in detail with reference to the drawings. However, the specific configuration is not limited to the embodiments, and the design can be changed without departing from the gist of the present invention. In addition, the above-described embodiments can be combined by utilizing each other's technology as long as there is no particular contradiction or problem in the purpose and configuration.

The invention claimed is:

1. A handheld electric vacuum configured to peform sucking work, comprising:
 a pipe including a suction port at one end and a discharge port at the other end;
 a blower provided outside the pipe and driven by an electric motor;
 a handle provided outside the pipe and near the discharge port in a longitudinal direction of the pipe, and configured to be held by a hand;
 an ejector provided near the suction port in the longitudinal direction of the pipe, and configured to feed pressurized wind generated by the blower into the pipe from around the pipe, and to eject the pressurized wind to the discharge port, wherein:
 the pipe includes a front pipe including the suction port, and a pipe body including the discharge port at its base end, the front pipe being connected to a front end of the pipe body;
 the ejector ejects the pressurized wind along an outside of the front pipe inserted into the pipe body,
 the front pipe is slidably connected to the pipe body; and
 a division plate is provided on a periphery of the front pipe and configured to switch between the discharge port and suction port to which the pressurized wind fed by the ejector is ejected.

2. A handheld electric vacuum configured to perform sucking work, comprising:
 a pipe including a suction port at one end and a discharge port at the other end;
 a blower provided outside the pipe and driven by an electric motor;
 a handle provided outside the pipe and near the discharge port in a longitudinal direction of the pipe, and configured to be held by a hand;
 an ejector provided near the suction port in the longitudinal direction of the pipe, and configured to feed pressurized wind generated by the blower into the pipe from around the pipe, and to eject the pressurized wind to the discharge port; and
 a battery configured to supply the electric motor with power, wherein:
 the ejector and the blower are disposed near a front side of the handheld electric vacuum, and
 the handle and the battery are disposed near a back side of the handheld electric vacuum.

3. The handheld electric vacuum according to claim 2, wherein an inside diameter of the pipe over an entire length of the pipe is equal to or greater than a bore of the suction port.

4. The handheld electric vacuum according to claim 2, wherein the pipe includes a bending portion between a center of the pipe in the longitudinal direction and the discharge port.

5. The handheld electric vacuum according to claim 2, wherein a center of gravity of a main body of the handheld electric vacuum is located below a grip of the handle.

6. The handheld electric vacuum according to claim 2, wherein:
 the ejector includes a circular flow path into which the pressurized wind generated by the blower is introduced, the circular flow path being provided around a central axis of the pipe and protruding outward from the pipe; and
 the pressurized wind becomes swirling flow around the central axis in the circular flow path.

7. The handheld electric vacuum according to claim 2, wherein:
 the pipe includes a front pipe including the suction port, and a pipe body including the discharge port at its base end, the front pipe being connected to a front end of the pipe body; and
 the ejector ejects the pressurized wind along an outside of the front pipe inserted into the pipe body.

8. The handheld electric vacuum according to claim 2, wherein the battery is attached to an outside of the pipe near the discharge port.

9. The handheld electric vacuum according to claim 8, wherein the handle is located between a center of gravity of the battery and a center of gravity of the blower.

* * * * *